United States Patent [19]

McCracken et al.

[11] Patent Number: 4,887,178

[45] Date of Patent: Dec. 12, 1989

[54] ALIGNED STRETCHED SURFACE RECORDING MEDIUM

[75] Inventors: John A. McCracken, White Bear Lake, Minn.; Barry L. Kelley, Wahpeton, N. Dak.

[73] Assignee: Minnesota Mining and Manufacturing Company, Saint Paul, Minn.

[21] Appl. No.: 205,686

[22] Filed: Jun. 13, 1988

[51] Int. Cl.$^4$ .......................... G11B 5/62; G11B 5/82; B32B 31/84; B23P 11/02

[52] U.S. Cl. ...................................... 360/135; 29/448; 156/292; 369/280; 428/65; 428/694

[58] Field of Search ................ 360/135, 133; 369/280; 156/292; 428/65, 694; 29/448

[56] References Cited

U.S. PATENT DOCUMENTS

| | | | |
|---|---|---|---|
| 3,373,413 | 3/1968 | Treseder | 340/174.1 |
| 3,509,274 | 4/1970 | Kihara | 178/6.6 |
| 3,537,083 | 10/1970 | Voth | 340/174.1 |
| 3,599,226 | 8/1971 | Lips | 346/74 MD |
| 4,365,257 | 12/1982 | Gerfast | 346/135.1 |
| 4,557,982 | 12/1985 | Nouda et al. | 428/694 |
| 4,573,097 | 2/1986 | Pastor et al. | 360/135 |
| 4,623,570 | 11/1986 | Alexander et al. | 428/65 |
| 4,625,384 | 12/1986 | Gerfast | 29/448 |
| 4,704,179 | 11/1987 | Yamamoto | 156/292 |
| 4,704,650 | 11/1987 | Yamamoto | 360/135 |
| 4,729,805 | 3/1988 | Alexander et al. | 360/135 |
| 4,742,421 | 5/1988 | Seto et al. | 360/135 |
| 4,779,160 | 10/1988 | Oishi | 360/135 |
| 4,800,458 | 1/1989 | Okita | 360/135 |

OTHER PUBLICATIONS

Bruce F. Blumentritt, "Anisotropy and Dimensional Stability of Biaxially Oriented Poly(ethylene Terephthalate) Films," Journal of Applied Polymer Science, vol. 23, pp. 3205–3217 (1979).

"3M's Big Breakthrough in Memory Disks," Businessweek, Nov. 12, 1984, p. 154.

James K. Knudsen, "Stretched-Surface Recording Disk for Use with a Flying Head," IEEE Transactions on Megnetics, vol. Mag. 21, No. 6, Nov. 1985, pp. 2588-2591.

C. Denis Mee and Eric D. Daniel, "Magnetic Recording, vol. 1 Technology," McGraw-Hill Book Company, New York, 1987, pp. 160, 161 and 494-497.

"3M Stretched Disks for High Performance, High Capacity and Low Cost," Data Recording Products Division/3M, St. Paul, Minnesota 1984.

Jerry L. Alexander, "Dimensional Track Stability Measurement Using a Standard Head," Computer Technology Review, Summer 1984, pp. 102 and 103.

"Standard Test Method for Modulus of a Flexible Barrier Material by Sonic Method," American National Standard, ANSI/ASTM F 89-68 (Reapproved 1973), pp. 355, and 360-366.

*Primary Examiner*—Robert S. Tupper
*Attorney, Agent, or Firm*—Donald M. Sell; Walter N. Kirn; Peter Forrest

[57] ABSTRACT

Stretched surface recording disk (SD) 10 comprises an annular support 12 having raised annular ridges 44 and 32 at or near its inside and outside diameters 22 and 30 with a base portion 24 in between the two ridges, and two annular recording medium films 14 and 16 held in radial tension and stretched across the base portion by adhering the film near the inside and outside diameters. The major principal orientation axis of each annular recording medium film 14 and 16 is determined and the SD assembled so that the axes are aligned in the same direction. This aligning results in SD with reduced track anisotropy due to warping of the annular support 12. As a result, data tracks are more stable than in previous SD, track density can be greaterd, and the SD is generally more reliable.

20 Claims, 4 Drawing Sheets

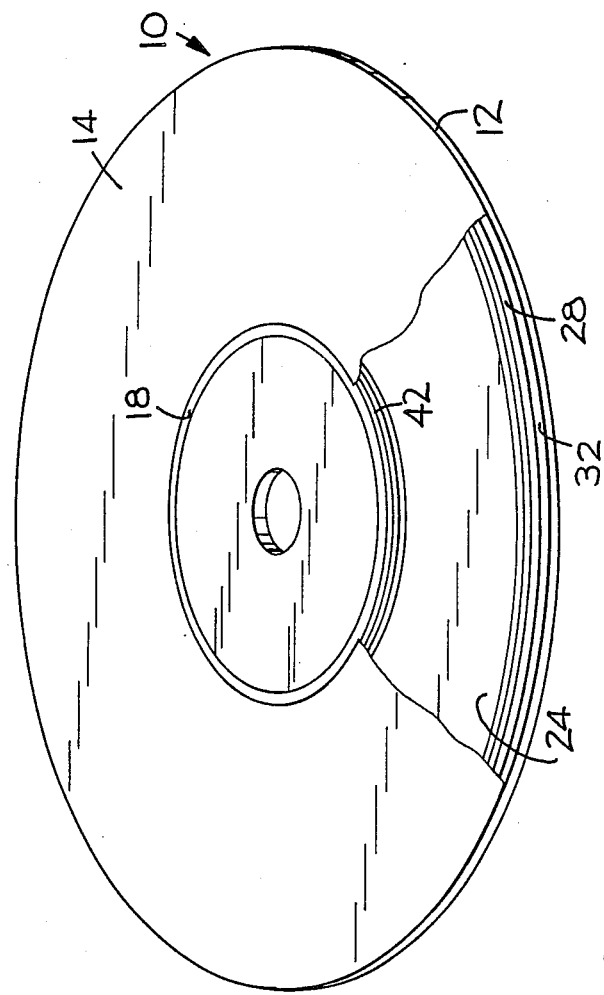
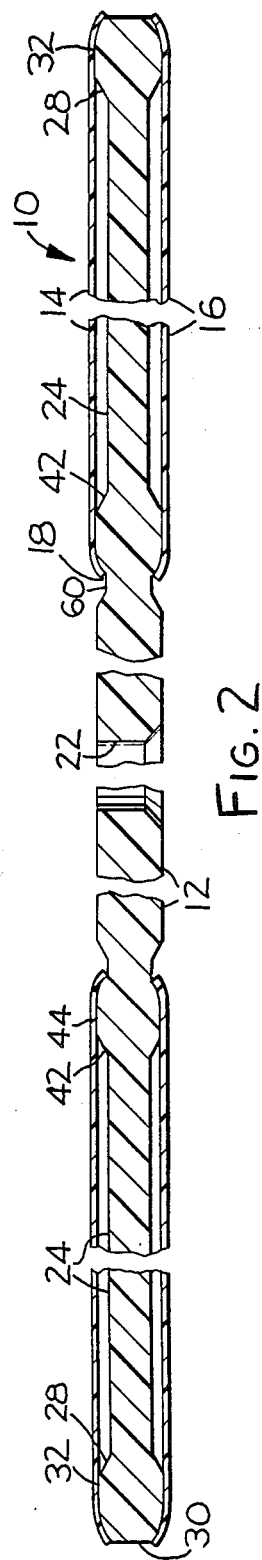
Fig. 1
Fig. 2

ALIGNED STRETCHED SURFACE RECORDING MEDIUM

TECHNICAL FIELD

This invention relates to magnetic recording media, particularly flexible magnetic recording sheets stretched across the major surfaces of a disk-shaped support to provide two planar recording surfaces.

BACKGROUND

Stretched surface recording disks (SD) generally consist of a rigid, circular support and a thin polymer film, having a recording layer, suitably attached to the periphery of the support. The development of SD has progressed over the years from a rather simple configuration described in U.S. Pat. No. 3,373,413 (Treseder) in which a film was stretched and clamped between two circular rings, to a dish-shaped support to which a stretched film was attached at the periphery as illustrated by U.S. Pat. No. 3,509,274 (Kilhara). Subsequently, U.S. Pat. No. 3,537,083 (Voth) introduced the concept of bonding the film at the center of the support in addition to the support periphery, and U.S. Pat. No. 3,599,226 (Lips) described an SD which included two stretched film surfaces, one on either side of the support, which were attached at the periphery and near the center of the support.

SD are superior to floppy disks in that a pressure pad is not required, and the recording surface has substantially the same overall dimensional stability as the relatively massive base to which it is attached. In addition, the SD provides a flat recording surface which may be deformed slightly to conform to a transducer head and irregularities in the surface of the head. Although the patents described above have illustrated the general configuration and certain desirable features of SD, practical problems remain as impediments to the mass production and general acceptance of SD. These include the problems of track dimensional stability and stress relaxation of the stretched film.

Track dimensional stability is an important parameter in the design of recording media and drive systems. A change in track shape can cause a serious loss in signal-to-noise ratio or the loss of prerecorded data. It has been determined that circular data tracks originally recorded on SD became elliptical or distorted as the SD were exposed to variations in environmental conditions. This track movement was not completely reversible, i.e., the original circular configuration was not obtained when the SD were returned to original environmental conditions. Thus track density is limited by the dimensional instability or anisotropy of the tracks.

It has been found that the tension or stress present in the stretched recording sheet decreases over time even without changing environmental conditions. This is referred to as stress relaxation and can also distort the data tracks.

U.S. Pat. No. 4,623,570 (Alexander, et al.) describes an SD which addresses these concerns by using a twice-annealed polymeric sheet as the substrate of the annular recording medium film. Data tracks recorded on SD made by this technique have significantly reduced track anisotropy when compared to SD made without twice-annealed polymeric sheets.

However, the present inventors have observed that if the radial tensions in the films of a two sided SD are not matched between the two faces of the disk at each point on the circumference of the SD, there will be an unbalance of radial tensions which will act to warp the SD. This unbalance is present, although to a lesser degree, even if the annealing techniques of Alexander, et al. are followed. In the worst case, where the diameters along which the disk support is warped toward the center of the disk are at right angles to each other, a saddle shaped disk is produced. The curvatures of the faces of the saddle shape vary with changes in the environmental conditions to which the disk is exposed. They also change when the environmental conditions are not changed, due to stress relaxation of the stretched film. In each case, distortion of the data tracks occurs.

DISCLOSURE OF INVENTION

A means has been found for further stabilizing the data tracks of a two-sided SD by negating the effects of unmatched radial tensions and the stress relaxation of the stretched recording medium film over time.

The invention is a two-sided stretched surface recording disk comprising:

(A) an annular support having:
  (1) at least one base portion between its inside and outside diameters;
  (2) an outer raised annular ridge attached to and projecting from the base portion on both sides of the annular support;
  (3) an inner raised annular ridge attached to and projecting from the base portion and having a diameter less than that of the outer raised annular ridge on both sides of the annular support;

(B) on one side of the disk, a first annular recording medium film which is
  (1) concentric with the annular support;
  (2) held in radial tension across and out of contact with the base portion;
  (3) bonded to the inner and outer raised annular ridges;
  (4) more than 35 percent anisotropic in at least one of the measurements of Young's modulus, yield stress, ultimate strength, ultimate elongation, thermal expansion, hygroscopic expansion, and refractive index;

(C) on the other side of the disk, a second annular recording medium film which is similar in shape and dimensions to the first annular recording medium film and is supported and bonded to the support like the first annular recording medium film;

(D) a dihedral angle θ defined as the angle between
  (1) the plane containing the major principal orientation axis of the first film and perpendicular to the plane of the second film, and
  (2) the plane containing the major principal orientation axis of the second film and perpendicular to the second film; wherein the first and second annular recording medium films are aligned such that the dihedral angle Θ is not more than ten degrees.

The term "radial tension" means tension stress pulling along all radii of the annulus of the recording medium film. This type of stress is produced by stretching the film over a circular ring or hoop. While radial stress is of concern because it can cause track anisotropy, there may be other stresses in the film such as circumferential stress.

The disks of this invention are made by a process which aligns the recording medium films with each other. In general, the principal orientation axes of the stretched films are found, and the disk is assembled, using the directions of the axes as a guide, so that the radial stresses in the upper and lower films tend to cancel each other out. The following steps can be used to manufacture the SD:

1. Provide two polymeric sheets, which will be the substrates of the annular recording medium films, and fix in radial tension by stretching.
2. Provide the recording medium on the substrates, if not done prior to the stretching of step 1.
3. Locate the major or minor principal orientation axes of the polymeric sheets through any means known in the art, and align the respective axes so as to minimize the imbalance in radial tensions of the sheets.
4. Bond the aligned sheets to the annular support at or near both its inside and outside diameters to obtain an SD. It is very desirable for the bonds between the annular support and the polymeric sheet to form a smooth seal free from bumps and loose spots. This step may involve additional stretching of the film, due to the geometry of the support.

By reducing track anisotropy, more data can be stored on an SD of a given size by recording narrower data tracks, closer together than was previously feasible.

BRIEF DESCRIPTION OF THE DRAWING

FIG. 1 is a perspective, cut-away view of an SD of this invention.

FIG. 2 is a cross-sectional view of the SD of FIG. 1.

DETAILED DESCRIPTION

Figure 4:
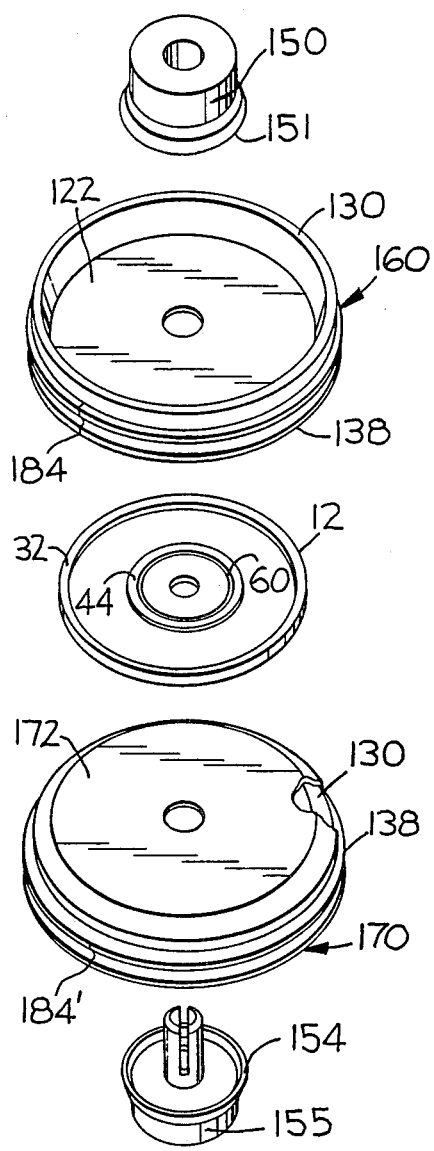
FIG. 4 is an exploded view of components of a partially assembled SD.

Referring to FIGS. 1 and 2 the SD, generally indicated as 10, has annular support 12 with outer and inner raised annular ridges 28 and 42, respectively. The base portion 24 of support 12, together with such ridges, defines an annular depression in the support over which the recording medium films 14 and 16 are stretched. Preferably, the annular support is made of a non-magnetic material which is rigid and dimensionally stable.

The annular support can be made of metal such as aluminum or steel, or of thermosetting or thermoplastic resin. It is typically made of filled polymeric material such as polysulfone, polyphenylene sulfide, polyester, polyetherimide, acrylonitrile-butadiene-styrene, polystyrene, polyamide (nylon) or polycarbonate resins filled with such materials as glass beads, fiber glass and mica (e.g., 20 weight percent fiberglass and 20 weight percent mica and 60 percent polymer resin). Preferably, it is injection molded in a single cavity mold.

The base portion of the support may be a flat continuous area joining the first and second raised annular ridges, or spokes which join these ridges. The support with spokes may be more difficult to manufacture and possibly less dimensionally stable.

The recording media films 14 and 16 can be any material which is useful for recording media, can be held in radial tension, and exhibits anisotropy in mechanical properties which affect track stability, such as Young's modulus, thermal expansion, and hygroscopic expansion. Typically, such a recording medium film would comprise a biaxially oriented, semicrystalline substrate on which is coated a pigment/binder recording medium, or other type of magnetizable recording medium such as a thin metal film (e.g., cobalt/chromium).

Not only magnetic recording, but other types of recording can benefit by the induced track stability of this invention. For example, layers suitable for optical recording, such as described in U.S. Pat. No. 4,365,257 (Gerfast), may comprise the recording layers applied to the substrate film.

The substrate should have dimensional stability, the feasibility of being stretched, a smooth surface, and the potential for being well adhered to the support material. Polyester (polyethylene terephthalate, or PET) and polyimide are possible substrate materials for magnetic media. It could be biaxially oriented polyester film or cast film.

Biaxially oriented polyester is known to have inherent anisotropy because of the stretching it undergoes during its manufacture in the machine direction (direction in which film exits the extruder) and in the transverse direction (90 degrees to the machine direction).

The anisotropy in mechanical properties, expansion coefficients, and long-term shrinkage of PET films was documented in Blumentritt, Bruce F., "Anisotropy and Dimensional Stability of Biaxially Oriented Poly(ethylene Terephthalate) Films," *Journal of Applied Polymer Science,* Volume 23, 3205-3217 (1979). Orientation of the crystalline and non-crystalline regions of the film occurs during the stretching of the film. This orientation determines the properties of the film and the anisotropy in the properties. Measurable mechanical properties dependent on the orientation include Young's modulus, sonic modulus, yield stress, ultimate strength, and ultimate elongation. The coefficient of thermal expansion and coefficient of hygroscopic expansion are also anisotropic, and there is a measurable birefringence in the plane of the film. In PET films, all these properties are believed to be dependent upon temperature and relative humidity.

Measurements made of any such property at regular angular intervals about a point in the center of a section of film, can be plotted on polar coordinates to illustrate the correspondence of the property measured and the machine and transverse directions of the film. The plot can be roughly elliptical in shape. Because the plot is elliptical, as opposed to circular, there is an anisotropy in the property, which may be quantified as the difference between the minimum and maximum values. Thus one may speak in terms of percentage of anisotropy (e.g., 20 percent anisotropic in a measured property means the maximum value of the property is 20 percent greater than the minimum value of the same property).

The major and minor axes of the elliptical plot of a given property are known as the major and minor principal orientation axes of that property, and the direction in which they lie in the plane of the film are known as the major and minor principal orientation directions of the film of that property. It has been shown that the major and minor principal orientation directions of the several properties generally agree for a single sample of film, and thus one may use the term "principal orientation axis" or "principal orientation direction" without specifying the specific property measured.

These directions do not necessarily lie along the machine and transverse directions determined by the manufacture of the film, although they may. The deviation of the principal orientation directions from the machine and transverse directions, and the anisotropy, increase as one moves in the transverse direction from the center of the film stock to the edges. Furthermore, the anisotropy of a particular sample is not necessarily the same for each property measured. Previous practice in the art was to use film selected only from the center of the film stock, equidistant from the edges, known in the art as "center cut" film. Artisans believed that this practice would tend to minimize the anisotropy effects because the anisotropy of the properties decreases (i.e., the polar plot becomes more circular) as the location of the film selection approaches the center of the film stock. Even with "center cut" film however, the anisotropy can be substantial, as much as 35 percent (measured in terms of sonic modulus). Hence, in a non-aligned SD, temperature and humidity dependent warping of the SD support can occur.

The alignment of orientation axes of the films on both sides of a two sided SD improves the stability of the SD, and hence track stability, by allowing the effects of anisotropic films on either side of the disk support to counteract each other as changes occur in the temperature and humidity to which the SD is exposed. The alignment of orientation axes also allows non-center cut film to be used in the construction of an SD. This is a benefit as it allows a larger number of SD to be assembled from a portion of film stock, since the entire width may be used.

Other layers known to those skilled in the recording media art (e.g. subbing layers or lubricant layers) may comprise part of the recording medium film.

The bonding of the magnetic recording sheet to the support of an SD should satisfy the following criteria: high shear strength to withstand the tension of the stretched medium; minimal creep between the recording medium film and the support to maintain data track stability; a smooth bonding surface to provide a smooth recording surface; and a short setting time to allow for high production volume.

Various means have been examined for bonding magnetic recording media film, the underside of which is typically polyethylene terephthalate, to supports of various materials (i.e. metals, plastics, composites). Thermosetting adhesives (e.g., cyanoacrylate or epoxy adhesives) may be used but have setting or curing times which are difficult to control.

The term "adhesive" means a substance capable of holding two bodies in intimate interfacial contact such that mechanical force can be transferred across the interface, and the term "cure" means to polymerize or cross-link into a set, rigid condition.

The preferred bonding agents are acrylate and methacrylate functional adhesives (e.g. hydantoin hexacrylate) which are curable by radiation, see Komp, J. T. and Mattingly, G. S., Radiation Processing, K&M Publications, Louisville, Ky., 1976. Some useful classes of such radiation curable materials are: acrylated epoxy resins, acrylated bis-phenol A resins, polyester acrylate resins, acrylated urethane resins, and alkyd acrylates.

The application of electron beam radiation in conjunction with hydantoin hexacrylate has been able to meet the required conditions, actually curing the adhesive trapped between the recording medium film and the support without damaging or in any known way lessening the usefulness of the product. The bond can be fully cured with no damp, uncured or rough spots, and the recording medium film is completely sealed to the support.

The polyethylene terephthalate commonly used as a substrate for magnetic recording media has a relatively low adhesion to most adhesives which can be cured with an electron beam. One method used to overcome this is to prime the back of the polyethylene terephthalate (i.e. the side to be adhered to the support 12) with a priming solution, such as 5 to 20 percent hydantoin hexacrylate plus 0.1 to 0.4 percent Irgacure 651 photoinitiator (made by Ciba Geigy Co.) in methylethylketone or 20 to 100 percent N,N-dimethylacrylamide in methyl ethyl ketone solvent. Such primers could be coated by rotogravure technique or sprayed onto the back of the polyester film at a thickness of about 0.1 to 0.2 micrometers and cured or partially cured by ultraviolet light. The primer solution should be well mixed, and fresh primer should be prepared immediately before use.

The recording media films 14 and 16 typically have a thickness of about 5 to 200 micrometers. It is the unsupported portion of the recording media films 14 and 16 between the two raised annular ridges which provides a deformable resilient, annular surface used to record signals from a transducer, such as a magnetic recording head. This surface is known as the data band.

The outer raised annular ridge 28 terminates in a reference surface 32 which supports recording medium film 14 and determines the spacing between the film and the surface of the base portion 24. Reference surface 32 also joins the outside periphery 30 of the support 12 to the outer raised annular ridge 28. Thus, its diameter is greater than that of the innermost part of the outer raised annular ridge. The recording medium film 14 is bonded to the reference surface 32.

Depending on the bonding method chosen, it may be advisable to incorporate, as part of support 12, an annular attachment surface just beyond the reference surface, and a means for preventing the bonding agent from flowing from the bonding surface to the reference surface 32. For example, in U.S. Pat. No. 4,623,570 (Alexander, et al.), a groove is employed to prevent a liquid adhesive from flowing from the bonding surface.

Adjacent the inner diameter 22 of the support 12, is the second raised annular ridge 42 which, like the first raised annular ridge 28, terminates in an inner reference surface 44 spaced above the surface of the intermediate portion 24. The distance of this spacing is usually about equal to the spacing of the outer reference surface 32 above the surface of the intermediate portion. The inside diameter 18 of the recording medium film 14 is adhered to the inner reference surface 44. Thus, its diameter is smaller than that of the outermost part of the inner raised annular ridge. Inner reference surface 44 curves into relief groove 60.

The term "outermost" means closest to the outside diameter of the support, and the term "innermost" means closest to the inside diameter of the support.

The first and second raised annular ridges 28 and 42 could have cross sectional shapes other than those shown in FIG. 2. For example, the ridges could be triangular in cross section with a rounded apex. The apex would provide a reference surface for the recording media films 14 and 16 and a fulcrum around which the films could be drawn.

The inner and outer reference surfaces 32 and 44 may also be coated with a primer. The following primers may be used: a 2 to 5 weight percent solution of hydantoin hexacrylate in methylethylketone with a photoinitiator, pure N,N-dimethylacrylamide, or cyanoacrylate adhesive coated onto the support and dried at room temperature. Both the hydantoin hexacrylate and dimethylacrylamide primers may be exposed to ultraviolet light.

Because the recording media films 14 and 16 are so well sealed to both the inner and outer reference surfaces, changes in atmospheric pressure can cause the air trapped between the support and the recording medium films to expand or contract which causes either a bulge or depression in the stretched surface of the recording media films. A small vent hole can be made in the surface of the films 14 and 16 near the inner raised annular ridge in order to equalize inside and outside air pressure.

Means known in the art for fixing a recording sheet in radial tension are used. In the embodiment shown in FIG. 4, a preferred variation of the method taught in U.S. Pat. No. 4,623,570 (Alexander, et al.) is used. This method produces the combination of the stretched recording medium held between the inner and outer mounting rings referred to as the upper subassembly 160. The subassembly comprises an inner mounting ring 130, an outer mounting ring 138, and a recording sheet 122. The outer diameter of the inner mounting ring 130, the inner diameter of the outer mounting ring 138, and the thickness of the recording medium sheet 122 are chosen to allow the recording medium sheet to fit tightly between the two rings and hold the subassembly together by friction.

One means known in the art for finding the principal orientation axes is examining the intensity of transmitted light when the sheet is placed between crossed polarizers. The principal orientation axes are found by noting the axes of the sheet which coincide with the axes of the crossed polarizers at maximum extinction of the transmitted light. The major principal orientation axis is then differentiated from the minor axis by measurement of the birefringence (difference in refractive index) of the two axes.

Figure 3:
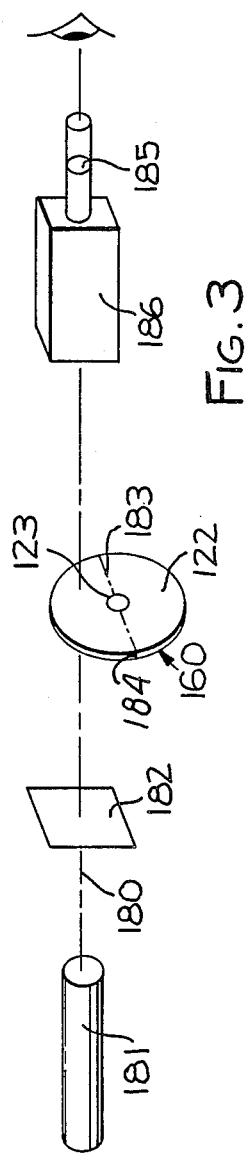
FIG. 3 is a diagram of a means of determining the principal orientation axes of a recording medium film.

This method is shown schematically in FIG. 3. The subassembly 160 is mounted with the plane of the sheet normal to the propagation direction of incident light 180. The light is produced by source 181, and is polarized, in a plane which lies at a 45 degree angle with respect to the vertical, by polarizer 182. The plane polarized light is directed through the recording medium sheet 122. If there is an anisotropy in the index of refraction of the sheet, i.e., the plot of refractive index is an ellipse and not a circle, the sheet will change the polarization of the light from plane polarization to elliptical polarization. This elliptically polarized light passes through a Babinet compensator 186, equipped with a polarizer 185 having a polarization axis aligned at 90 degrees with respect to that of the polarizer 182. If the recording medium sheet 122 did not elliptically polarize the light, the intensity of light observed through the eyepiece would be zero, as the cross polarizers effectively prevent light transmission. Because the light is elliptically polarized by the recording medium sheet, the light observed at the eyepiece is not extinguished, unless either principal orientation axis of the sheet is aligned with either polarization axis of the polarizers 182 or 185. Thus, rotation of the subassembly until the transmitted light is extinguished allows one to find the angular location of the major and minor principal axes. However, this procedure does not determine which axis is the major axis, i.e., the axis of greatest refractive index, as it does not identify whether the major principal axis is aligned with the polarization axis of polarizer 182 or that of polarizer 185.

Identification of the major axis requires two measurements of the index of refraction, one on each principal axis. With each principal axis of the sheet 122 and of the polarizer 185 aligned, the index of refraction is measured with the Babinet compensator. The Babinet compensator is comprised of two wedges of quartz, cut with their optical axes perpendicular to each other, and a means of producing an interference pattern. The quartz wedges have equal wedge angles but opposite birefringence. They are assembled in the compensator such that the quartz wedges slide past each other, increasing the total distance of the light path through both wedges. Through the eyepiece, one may observe the interference pattern with no recording medium sheet in the light path. The increase in path length required to produce the same interference pattern with the recording medium sheet in the light path as is observed without the sheet in the path, is directly related to the index of refraction of the recording medium sheet. The compensator is constructed to accurately measure this increase in path length. This allows one to measure the index of refraction at each principal axis, and the major principal axis is that with the largest index of refraction.

Other optical elements such as a monochromatic filter, collimator, or microscope may be included to improve the visibility of the interference pattern.

In this manner the location of the major principal orientation axis 183 is determined, and the axis is aligned with reference mark 184 on the subassembly 160 as shown in FIG. 3.

Other means known in the art for determining a principal orientation axis may also be employed. For example, by cutting samples radially from the recording medium sheet along regular angular intervals (typically 15 degrees) from a reference point such as the machine direction. Measurements of Young's modulus of the samples can be made from the stress-strain curves using a tensile testing machine in accordance with the procedures of ASTM Standard D882-83. Maximum and minimum values of Young's modulus as a function of angular position correspond to the major and minor principal orientation axes, respectively.

Another preferred method to measure the angular dependence of properties of the recording medium sheet is to measure the amount of force needed to achieve a given amount of deformation of the stretched film, for example, grams force per 25 micrometers of downward deformation of the stretched sheet. This measurement is called penetration stiffness. Penetration stiffness measurements reflect the mechanical properties of the substrate, and thus can be used to determine the major and minor principal orientation axes of properties such as Young's modulus. Penetration stiffness is measured near the radial center of the data band portion of the stretched film using a probe with a hemispherical tip of approximately 6 mm diameter. The transducer is a linear variable differential transformer connected to a force measuring instrument. Measurements should be made at points equidistant from the center of the SD and angularly separated by the minimum resolution capability of the apparatus used to locate the probe A deviation of more than plus or minus 0.2 g per mil (g/25 micrometers) between the maximum and minimum values would be considered significant.

Yet another preferred method to measure the angular dependence of properties of the recording medium sheet is to measure the sonic modulus, from which Young's modulus may be calculated. A method for measuring sonic modulus is described in ASTM Standard F 89-68 (1973). In general, two piezoelectric transducers, each having a resonant frequency in the range from 3 to 10 kHz, are clamped to a taut sample of film. A sonic pulse is emitted from one transducer, and detected by the other, with appropriate circuitry. Two sets of pulse travel time and transducer separation distance measurements are made, for pulse travel times of at least 50 and 100 microseconds. The longitudinal sonic velocity is calculated, and from it the sonic and Young's moduli may be calculated as described in the standard.

The central hole 123 should be small enough to have only negligible effect on stress distribution in the portion of the recording medium sheet which will become the data band. For SD of about 13 cm diameter, a central hole of about 6 mm diameter is suitable.

The lower subassembly 170 shown in FIG. 4 is assembled in a similar fashion. When the major principal orientation axis of the second recording medium film 172 is located, it is also aligned with respect to a reference mark 184' on the outer mounting ring 138 of lower subassembly 170. In this manner, the axes of the first and second films 122 and 172 will be aligned with each other by assembling the two subassemblies 160 and 170 so that the reference marks 184 and 184, are aligned with each other.

The raised annular ridges of support 12 are burnished by moving support 12 circularly over an abrasive lapping film.

Ideally, the assembly steps described hereafter are done in a clean room environment in which atmospheric contaminants such as dust and other particulates are removed from the air. Operators should wear a mask and gloves.

In a typical case, a stretched recording medium sheet about 38 micrometers thick in a subassembly has a penetration stiffness of about six grams force per 25 micrometers of deformation (corresponding to about 7000 psi (48000 kPa) radial stress). In the preferred embodiment, the subassemblies are annealed (also known as accelerated stress relaxation) as taught in U.S. Pat. No. 4,623,570 (Alexander, et al.) at column 8, lines 6 to 30. This process reduces penetration stiffness typically to about 2 grams force per 25 micrometers deformation (about 1500 psi or 10,000 kPa radial stress) for SD of 13 cm diameter.

The support 12 is cleaned ultrasonically. Then, the adhesive is applied in a thin layer to the inner and outer references surfaces 44 and 32. As taught in U.S. Pat. No. 4,623,570 (Alexander, et al.), a preferred adhesive is hydantoin hexacrylate, mixed in equal proportions with dimethyl acrylamide. The latter lowers the viscosity of the mixture to ease the application of a very thin, uniform film of the adhesive to the bonding areas at the periphery of the annular support. Care should be taken to avoid the presence of adhesive on the inside diameter portion of the support, the area which would be clamped onto a drive hub. Dried adhesive on that area can adversely affect operation of the SD.

Figure 5:
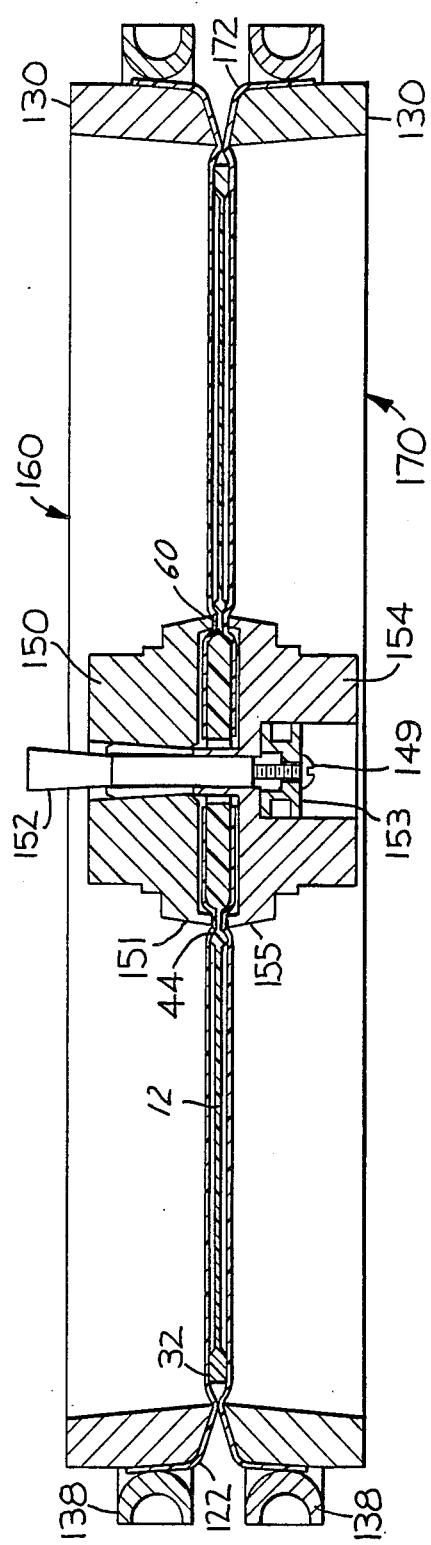
FIG. 5 is a sectional view of an assembly comprising the components of FIG. 4.

The side of the stretched recording medium film in each subassembly which will face the support 12 is wiped with heptane and blown clean with ionized air. Referring to FIG. 4, the lower subassembly 170 is placed on lower hub 154; the support 12 is centered on the lower subassembly; upper subassembly 160 is placed over the support and lower subassembly, with the reference marks 184 aligned with each other; and the upper hub 150 is centered on the recording medium sheet 122. The upper and lower subassemblies may be clamped together by any convenient means. Referring to FIG. 5, screw 149 is inserted through hub stop 153, the central holes in hubs 150 and 154, and is threaded into the central hole in the actuator 152. The outside diameter of hubs 150 and 154 is slightly less than the diameter of the inner raised annular ridge 44, and as the central screw 149 is tightened, the edges of the hubs are drawn into relief groove 60 of FIG. 4, consequently forcing the recording media sheets 122 and 172 into close contact with the inner raised annular ridges.

The adhesive in the completely assembled SD stretching fixture shown in FIG. 5 is then cured, e.g. by exposure to an electron beam (e-beam). One e-beam apparatus useful for this step is an Electro-Curtain machine manufactured by EnergySciences Inc. in Woburn, Mass. The SD stretching fixture is placed on a conveyor belt which in turn travels through the electron beam apparatus. The e-beam apparatus is typically operated at 175 kv and a current of 6.7 mA when conveying speed is about 12 meters per minute or about 3.3 milliamperes when the conveying speed through the curing chamber is about 6 meters per minute. The intensity of each exposure of the SD stretching fixture to an electron beam is no more than about 10 MRad. After the SD stretching fixture has been exposed to the electron beam on one side, it is then exposed in a similar manner on the opposite side.

For purposes of the e-beam process, hubs 150 and 154 have bevels, 151 and 155 respectively, to ensure that the inner reference surface 44 is actually exposed to the electron beam. As can be seen from FIG. 5, the outer reference surface 32 is also left accessible to the electron beam, since the upper and lower subassemblies 160 and 170 actually have inside diameters larger than that of the outer reference surface. The electron beam can penetrate the polymeric material as well as the magnetic layer of the recording media sheets 122 and 172, but it cannot penetrate the metal of the subassemblies or hub. Thus, it is important that the bond areas not be obstructed by metal.

After e-beam curing on both sides of the SD, the hubs 150 and 154 can be removed by removing the screw 149. Then, the portions of recording media sheets 122 and 172 in the center can be removed by cutting them out, being careful not to cut into the inner reference surface 44. The upper and lower subassemblies 160 and 170 are disassembled, and any excess recording media film beyond the outside diameter of the SD support is cut away.

The stretched film will normally have experienced an increase in penetration stiffness over that which it had after the first annealing step, previously described. In the preferred embodiment, this added stress is relieved by a second annealing of the assembled SD, similar to that described above, as taught by U.S. Pat. No. 4,623,570 (Alexander, et al.), at column 10, lines 23 to 60. Final penetration stiffness is preferably greater than 1.6 g/25 micrometers deformation.

To be considered stable, an SD should be able to maintain track stability with changes in temperature and humidity.

A procedure for measuring track stability is taught in Alexander, J. L., "Dimensional Track Stability Measurement Using a Standard Head," Computer Technology Review, Summer, 1984, pp. 102–103. For SD, a magnetic head such as that taught in European Pat. Office Publication No. 0 213 875 (Mar. 3, 1987) is used to record a few concentric pairs of tracks on the medium at different frequencies. For example, one track at 600 KHz is recorded adjacent a 900 KHz track, each such set of tracks being separated by an erased area. The head is moved across each set of tracks in small precise steps as the SD is rotated, and the signal amplitude is measured at each position. The read head is then located between two of the tracks at a point where the signal amplitude from both frequencies is the same. At this centered position, the signal amplitude of each frequency is measured at regular intervals around the disk. With low amplitude modulation, these measurements produce a circle when plotted on polar coordinates. Then, environmental conditions are changed, and the same readings are taken. Changes in track shape are detected by changes in the relative strengths of the two read signals. Track anisotropy data are reported as microinches or micrometers of deviation of tracks from their original circular path, as conditions change. The maximum amount of track anisotropy for SD of this invention is generally observed in track pairs recorded near the outer diameter of the SD. For a two-sided disk, the anisotropy value can be calculated as the maximum value of deviation of the individual track pairs, measured on the outer diameter of both sides of the SD.

To measure the track anisotropy of an optical (non-magnetic) SD, one track may be recorded, environmental conditions changed, and the track can be read. Because optical tracks have sufficient resolution for accurate reading (e.g. 1 micrometer bits) and optical disk drives have a servo mechanism driving the read head, the deviation of a track from the original circular path can be detected by observing the movement of the servo mechanism. Alternatively, the previously described two track method can be used.

Figure 6:
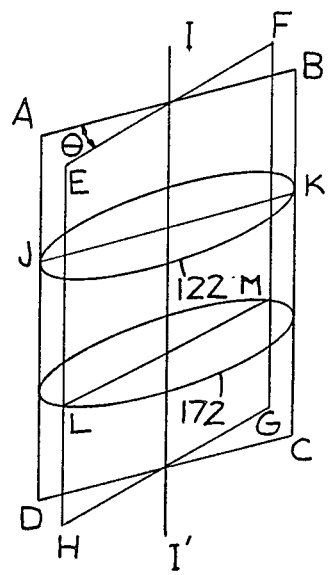
FIG. 6 is a diagram of the geometric relationship of the recording media of the assembled SD.

FIG. 6 shows the geometric relationship of the aligned major principal orientation axes. The upper and lower recording medium sheets 122 and 172, respectively, lie in mutually parallel planes (not shown) and are concentric about line II, perpendicular to each sheet. The upper sheet has major principal orientation axis JK, which lies in a plane ABCD which is perpendicular to the plane of the upper sheet. Similarly, the lower sheet has major principal orientation axis LM, lying in plane EFGH. The dihedral angle $\Theta$ is formed by planes ABCD and EFGH. Ideally, this angle is zero, in which case the two major axes will lie in a common plane, and as can be shown by a person of ordinary skill in geometry, the axes will necessarily be parallel to each other.

SD which were assembled with $\Theta$ deliberately set at 90 degrees, the worst case value, have been tested for track anisotropy. The polyester from which their recording media films were made had been cut from the edge region of a biaxially oriented film and not the preferred center region. These SD were first brought to equilibrium at 5° C., and the sets of concentric data tracks were recorded. Then, they were brought to equilibrium at 60° C. after which measurements were again made. Track anisotropies were measured in the range of 100 microinches (2.5 micrometers) to 140 microinches (3.5 micrometers).

The anisotropy of the aligned SD of this invention, measured by the above-described technique, is significantly decreased over non-aligned SD. Measured SD distortion over the same change in temperature from 5° C. to 60° C. decreased to a range of 60 microinches (1.5 micrometers) to 100 microinches (2.5 micrometers).

The invention will be further clarified by the following examples.

EXAMPLE I

Two sets of SD were made using the following components: recording medium film of polyester having a pigment/binder type magnetic layer; injection molded polyether imide annular support; and adhesive made of a mixture of hydantoin hexacrylate and N,N-dimethylacrylamide. They were made by processes which were the same in all respects, except that the nine disks of set SD1 were assembled such that $\Theta$ was 0 degrees, while the eight disks of set SD2 were assembled such that $\Theta$ was 90 degrees. Each SD was stabilized at 5° C., after which three concentric tracks were recorded at about the middle of the data band. The environment was changed to 60° C. and held stable. The SD were then tested for track anisotropy. The average anisotropy of the 9 disks of inventive set SD1 was 2.0 micrometers and that of the 8 disks of set SD2 was 2.8 micrometers.

EXAMPLE II

To measure track anisotropy as a function of $\Theta$, two sets of four SD each were assembled and tested as described in Example I, except that in the control set, known collectively as SD3, $\Theta$ was 10 degrees, and not 90 degrees. In the other set, known collectively as SD4, $\Theta$ was zero degrees. The average track anisotropy of SD3 was 2.3 micrometers and that of SD4 was 1.3 micrometers.

Other embodiments of this invention will be apparent to those skilled in the art from a consideration of this specification or practice of the invention. Various omissions, modifications and changes to these principles may be made by one skilled in the art without departing from the full scope of the invention, which is described by the following claims.

We claim:

1. A two-sided stretched surface recording disk comprising:
    (A) an annular support having
        (1) at least one base portion between its inside and outside diameters;
        (2) an outer raised annular ridge attached to and projecting from the base portion on both sides of the annular support;
        (3) an inner raised annular ridge attached to and projecting from the base portion and having a diameter less than that of the outer raised annular ridge on both sides of the annular support;
    (B) on one side of the disk, a first annular recording medium film which is
        (1) concentric with the annular support;
        (2) held in radial tension across and out of contact with the base portion;
        (3) bonded to the inner and outer raised annular ridges;
        (4) greater than 35 percent anisotropic in a measurement of sonic modulus; and
    (C) on the other side of the disk, a second annular recording medium film which is similar in shape and dimensions to the first annular recording medium film, is supported and bonded to the support like the first annular recording medium film;

wherein the first and second annular recording medium films are aligned such that the dihedral angle Θ is not more than ten degrees, said dihedral angle Θ being defined as the angle between
   (1) the plane containing the major principal orientation axis of the first film and perpendicular to the plane of the second film, and
   (2) the plane containing the major principal orientation axis of the second film and perpendicular to the second film.

2. The stretched surface recording disk of claim 1 in which the second annular recording medium film is greater than 35 percent anisotropic in a measurement of sonic modulus.

3. The stretched surface recording disk of claim 1 in which Θ is not more than five degrees.

4. The stretched surface recording disk of claim 1 in which the major principal orientation axes of the first and second annular recording medium films are in a common plane and parallel to each other.

5. The stretched surface recording medium of claim 1 in which the major principal orientation axes are the major principal axes of Young's modulus.

6. The stretched surface recording medium of claim 1 in which the major principal orientation axes are the major principal axes of sonic modulus.

7. The stretched surface recording medium of claim 1 in which the major principal orientation axes are the major principal axes of yield stress.

8. The stretched surface recording medium of claim 1 in which the major principal orientation axes are the major principal axes of ultimate strength.

9. The stretched surface recording medium of claim 1 in which the major principal orientation axes are the major principal axes of ultimate elongation.

10. The stretched surface recording medium of claim 1 in which the major principal orientation axes are the major principal axes of thermal expansion.

11. The stretched surface recording medium of claim 1 in which the major principal orientation axes are the major principal axes of hygroscopic expansion.

12. The stretched surface recording medium of claim 1 in which the major principal orientation axes are the major principal axes of refractive index.

13. A method for assembling a two-sided stretched surface recording disk comprising a rigid annular support having at least one base portion between its inside and outside diameters; at least two concentric raised annular reference surfaces; and two annular polymeric films, having recording layers, one of which is at least 35 percent anisotropic in a measurement of sonic modulus, bonded to the support and stretched between and supported by the raised annular reference surfaces such that each film is held in radial tension across and out of contact with the base portion of the support; said method comprising:
   (A) determining the major principal orientation direction of the first recording medium film;
   (B) determining the major principal orientation direction of the second recording medium film;
   (C) bonding the first and second recording medium films to the support such that the dihedral angle Θ is not more than ten degrees, said dihedral angle Θ being defined a the angle between
      (1) the plane containing the major principal orientation axis of the first film and perpendicular to the plane of the second film, and
      (2) the plane containing the major principal orientation axis of the second film and perpendicular to the second film.

14. The method assembling a two-sided stretched surface recording disk of claim 13, in which both recording layers are at least 35 percent anisotropic in any mechanical, thermal, or optical property.

15. The method of assembling a two-sided stretched surface recording disk of claim 13, in which Θ is not more than five degrees.

16. The method of assembling a two-sided stretched surface recording disk of claim 13, in which the major principal orientation axes of the first and second annular recording medium films are in a common plane and parallel to each other.

17. The method of assembling a two-sided stretched surface recording disk of claim 13, in which either principal orientation direction determined is that of Young's modulus.

18. The method of assembling a two-sided stretched surface recording disk of claim 13, in which either principal orientation direction determined is that of sonic modulus.

19. The method of assembling a two-sided stretched surface recording disk of claim 13, in which either principal orientation direction determined is that of yield stress.

20. The method of assembling a two-sided stretched surface recording disk of claim 13, in which either principal orientation direction determined is that of refractive index.

* * * * *